(12) United States Patent
Roeck et al.

(10) Patent No.: US 7,469,414 B1
(45) Date of Patent: *Dec. 23, 2008

(54) FAST AND RELIABLE DATA CARRIER DETECTION BY A CABLE MODEM IN A CABLE TELEVISION PLANT

(75) Inventors: Guenter E. Roeck, San Jose, CA (US); Wei-Sing Chen, Fremont, CA (US); Charles J. Naegeli, Montara, CA (US)

(73) Assignee: Cisco Technology, Inc., San Jose, CA (US)

( * ) Notice: Subject to any disclaimer, the term of this patent is extended or adjusted under 35 U.S.C. 154(b) by 983 days.

This patent is subject to a terminal disclaimer.

(21) Appl. No.: 10/406,866

(22) Filed: Apr. 4, 2003

Related U.S. Application Data

(63) Continuation of application No. 09/227,990, filed on Jan. 8, 1999, now Pat. No. 6,574,796.

(51) Int. Cl.
*H04N 7/173* (2006.01)
*H04N 17/00* (2006.01)

(52) U.S. Cl. .............. 725/111; 725/131; 348/193; 375/326; 375/340; 370/207

(58) Field of Classification Search .............. 725/111; 348/193
See application file for complete search history.

(56) References Cited

U.S. PATENT DOCUMENTS

| | | | |
|---|---|---|---|
| 5,225,902 A | 7/1993 | McMullan, Jr. | |
| 5,260,974 A | 11/1993 | Johnson et al. | 375/76 |
| 5,671,253 A | 9/1997 | Stewart | 375/316 |
| 5,717,471 A * | 2/1998 | Stewart | 348/726 |
| 5,729,824 A | 3/1998 | O'Neill et al. | |
| 5,790,523 A | 8/1998 | Ritchie, Jr. | |
| 5,799,037 A | 8/1998 | Strolle et al. | 375/233 |
| 5,862,451 A | 1/1999 | Grau et al. | 455/5.1 |
| 5,943,604 A | 8/1999 | Chen et al. | 455/5.1 |
| 6,032,019 A * | 2/2000 | Chen et al. | 725/124 |
| 6,037,835 A | 3/2000 | Smith et al. | 329/316 |
| 6,122,334 A | 9/2000 | Hughes | |
| 6,400,928 B1 | 6/2002 | Khuller et al. | 455/67.1 |
| 6,574,796 B1 * | 6/2003 | Roeck et al. | 725/111 |

OTHER PUBLICATIONS

R.P.C. Wolters, "Characteristics of Upstream Channel Noise in CATV Networks", IEEE Transactions in Broadcasting, vol. 42, No. 4, pp. 328-332 1996.

(Continued)

*Primary Examiner*—Christopher Grant
*Assistant Examiner*—Shelton Austin
(74) *Attorney, Agent, or Firm*—Weaver Austin Villeneuve & Sampson LLP

(57) ABSTRACT

Apparatus, methods, and computer program products for detecting or locating a viable data carrier in a downstream channel by a cable modem. Potential channels for data carriers can be eliminated quickly by going through a "screening" process, i.e., the first constellation diagram match, thereby preventing those potential channels from going through a significantly more time-consuming second constellation match. The determination of whether the signal in the potential channel is modulated according to the first particular modulation scheme is done rapidly and only potential channels containing a signal likely to be modulated according to the second particular modulation scheme are examined for the second determination step.

54 Claims, 4 Drawing Sheets

OTHER PUBLICATIONS

Rogers Engineering, "Two-Way CATV Plant Characterization Test Procedures", Test Procedures for Two-Way CATV Plant Characterization, p. 8, 1993.

ANSI® "Carrier-to-Customer Installation—DSI Metallic Interface", American National Standard for Telecommunications, T1.403, 1998.

Ulm, et al., "Data-over-Data Cable Service Interface Specification", Radio Frequency Interface Specification, No. 102-971008, 1997.

R.P.C. Wolters, "Characteristics of Upstream Channel Noise in CATV Networks", IEEE Transaction in Broadcasting, vol. 42, No. 4, pp. 328-332, 1996.

Rogers Engineering, "Two-Way CATV Plant Characterization Test Procedures", Test Procedures for Two-Way CATV Plant Characterization, p. 8, 1993.

ANSI® "Carrier-to-Customer Installation—DSI Metallic Interface", American National Standard for Telecommunications, T1.403, 1998.

Ulm, et al., "Data-over-Data Cable Service Interface Specification", Radio Frequency Interface Specification, No. 102-971008, 1997.

Roeck, et al., "Fast & Reliable Data Carrier Detection By a Cable Modem in a Cable Television Plant," U.S. Appl. No. 09/227,990, filed Jan. 8, 1990, Pending Issuance.

* cited by examiner

FAST AND RELIABLE DATA CARRIER DETECTION BY A CABLE MODEM IN A CABLE TELEVISION PLANT

CROSS-REFERENCES TO RELATED APPLICATIONS

This application is a continuation of U.S. patent application Ser. No. 09/227,990 filed Jan. 8, 1999 now U.S. Pat. No. 6,574,796 in the name of Guenter E. Roeck, Wei-Sing Chen, and Charles J. Naegeli, and entitled "FAST AND RELIABLE DATA CARRIER DETECTION BY A CABLE MODEM IN A CABLE TELEVISION PLANT. That application is incorporated herein by reference in its entirety and for all purposes.

This application is related to U.S. patent application Ser. No. 08/962,231 filed on Oct. 31, 1997, entitled "Echo Device Method for Locating Upstream Ingress Noise Gaps at Cable Television Headends," which is incorporated herein by reference in its entirety and for all purposes.

BACKGROUND OF THE INVENTION

1. Field of the Invention

The present invention relates generally to cable modem technology for receiving and transmitting data in a cable plant. More specifically, it relates to locating or detecting an appropriate data carrier in a downstream channel upon powering up a cable modem.

2. Discussion of Related Art

The cable TV industry has been upgrading its signal distribution and transmission infrastructure since the late 1980s. In many cable television markets, the infrastructure and topology of cable TV systems now include fiber optics as part of its signal transmission component. This has accelerated the pace at which the cable industry has taken advantage of the inherent two-way communication capability of cable systems. The cable industry is now poised to develop reliable and efficient two-way transmission of digital data over its cable lines at speeds orders of magnitude faster than those available through telephone lines, thereby allowing its subscribers to access digital data for uses ranging from Internet access to cable commuting.

Originally, cable TV lines were exclusively coaxial cable. The system included a cable headend, i.e. a distribution hub, which received analog signals for broadcast from various sources such as satellites, broadcast transmissions, or local TV studios. Coaxial cable from the headend was connected to multiple distribution nodes, each of which could supply many houses or subscribers. From the distribution nodes, trunk lines (linear sections of coaxial cable) extended toward remote sites on the cable network. A typical trunk line is about 10 kilometers long. Branching off of these trunk lines were distribution or feeder cables (40% of the system's cable footage) to specific neighborhoods, and drop cables (45% of the system's cable footage) to homes receiving cable television. Amplifiers are provided to maintain signal strength at various locations along the trunk line. For example, broadband amplifiers are required about every 2000 feet depending on the bandwidth of the system. The maximum number of amplifiers that can be placed in a run or cascade is limited by the build-up of noise and distortion. This configuration, known as tree and branch, is still present in older segments of the cable TV market.

With cable television, a TV analog signal received at the headend of a particular cable system is broadcast to all subscribers on that cable system. The subscriber simply needed a television with an appropriate cable receptor to receive the cable television signal. The cable TV signal was broadcast at a radio frequency range of about 50 to 860 MHz. Broadcast signals were sent downstream; that is, from the headend of the cable system across the distribution nodes, over the trunk line, to feeder lines that led to the subscriber's home or premises. However, the cable system did not have installed the equipment necessary for sending signals from subscribers to the headend, known as return or upstream signal transmission. Not surprisingly, nor were there provisions for digital signal transmission either downstream or upstream.

In the 1980s, cable companies began installing optical fibers between the headend of the cable system and distribution nodes (discussed in greater detail in FIG. 1 below). The optical fibers reduced noise, improved speed and bandwidth, and reduced the need for amplification of signals along the cable lines. At many locations, cable companies installed optical fibers for both downstream and upstream signals. The resulting system is known as a hybrid fiber-coaxial (HFC) system. Upstream signal transmission was made possible through the use of duplex or two-way filters. These filters allow signals of certain frequencies to go in one direction and signals having different frequencies to go in the opposite direction. This new upstream data transmission capability allowed cable companies to use set-top cable boxes and allowed subscribers pay-per-view functionality, i.e. a service allowing subscribers to send a signal upstream through the cable system to the headend indicating that they want to see a certain program.

In addition, cable companies began installing fiber optic lines into the trunk lines of the cable system in the late 1980s. A typical fiber optic trunk line can be up to 80 kilometers long, whereas a typical coaxial trunk line is about 10 kilometers long. Prior to the 1990s, cable television systems were not intended to be general-purpose communication mechanisms. Their primary purpose was transmitting a variety of television signals to subscribers. Thus, there had to be one-way transmission paths from a central location, known as the headend, to each subscriber's home, delivering essentially the same signals to each subscriber. HFC systems run fiber deep into the cable TV network offering subscribers more neighborhood specific programming by segmenting an existing system into individual serving areas having between 100 to 2,000 subscribers. Although networks using exclusively fiber optics would be optimal, present cable networks equipped with HFC configurations are capable of delivering a variety of high bandwidth, interactive services to homes for significantly lower costs than networks using exclusively fiber optic cables.

FIG. 1 is a block diagram of a two-way HFC cable system utilizing a cable modem for data transmission. It shows a headend 102 (essentially a distribution hub) which can typically service about 40,000 subscribers. Headend 102 contains a cable modem termination system (CMTS) 104 needed when transmitting and receiving data using cable modems. Headend 102 is connected through pairs of fiber optic lines 106 (one line for each direction) to a series of fiber nodes 108.

Each headend can typically support up to 80 fiber nodes. Pre-HFC cable systems used coaxial cables and conventional distribution nodes. Since a single coaxial cable was capable of transmitting data in both directions, one coaxial cable ran between the headend and each distribution node. In addition, because cable modems were not used, the headend of pre-HFC cable systems did not contain a CMTS. Each of the fiber nodes 108 is connected by a coaxial cable 110 to duplex filters 112 which permit certain frequencies to go in one direction and other frequencies to pass in the opposite direction (frequency ranges for upstream and downstream paths are discussed below). Each fiber node 108 can normally service about 500 subscribers, depending on the bandwidth. Fiber node 108, coaxial cable 110, two-way amplifiers 112, plus distribution amplifiers 114 along trunk line 116, and subscriber taps 118, i.e. branch lines, make up the coaxial distribution system of an HFC system. Subscriber tap 118 is connected to a cable modem 120. Cable modem 120 is, in turn, connected to a subscriber computer 122 or other appropriate device.

As briefly mentioned above, recently it has been contemplated that HFC cable systems can be used for two-way transmission of digital data. The data can be Internet data, digital audio data, or digital video data, in MPEG format, for example, from one or more external sources 100. Using two-way HFC cable systems for transmitting digital data is attractive for a number of reasons. Most notably, they provide up to a thousand times faster transmission of digital data than is currently possible over telephone lines. However, in order for a two-way cable system to provide digital communications, subscribers must be equipped with cable modems, such as cable modem 120. With respect to Internet data, the public telephone network has been used, for the most part, to access the Internet from remote locations. Through telephone lines, data is typically transmitted at speeds ranging from 2,400 to 56,600 bits per second (bps) using commercial (and widely used) data modems for personal computers. Using a two-way HFC system as shown in FIG. 1 with cable modems, data can be transmitted at speeds of 10 million bps, or more. Table 1 is a comparison of transmission times for transmitting a 500 kilobyte image over the Internet.

TABLE 1

Time to Transmit a Single 500 Kbyte Image

| | |
|---|---|
| Telephone Modem (28.8 kbps) | 6-8 minutes |
| ISDN Line (64 kbps) | 1-1.5 minutes |
| Cable Modem (10 Mbps) | 1 second or less |

Furthermore, subscribers can be fully connected twenty-four hours a day to services without interfering with cable television service or phone service. The cable modem, an improvement of a conventional data modem, provides this high speed connectivity and, therefore, is instrumental in transforming the cable TV system into a full service provider of video, voice and data telecommunications services.

As mentioned above, the cable TV industry has been upgrading its coaxial cable systems to HFC systems utilizing fiber optics to connect headends to fiber nodes and, in some instances, using them in the trunk lines of the coaxial distribution system. In way of background, optical fiber is constructed from thin strands of glass that carry signals longer distances and have a wider bandwidth than either coaxial cable or the twisted pair copper wire used by telephone companies. Fiber optic lines allow signals to be carried much greater distances without the use of amplifiers (item 114 of FIG. 1). Amplifiers degrade the signal quality and can be expensive to maintain. Thus, coaxial distribution systems that use fiber optics have much less need for amplifiers. In addition, amplifiers are typically not needed for fiber optic lines (item 106 of FIG. 1) connecting the headend to the fiber nodes.

In cable systems, digital data is carried over radio frequency (RF) carrier signals. Cable modems are devices that convert a modulated RF signal to digital data (demodulation) and converts the digital data back to a modulated RF signal (modulation). The conversion is done at two points: the subscriber's home by a cable modem and at a CMTS located at the headend. The CMTS converts the digital data to a modulated RF signal which is carried over the fiber and coaxial lines to the subscriber premises. The cable modem then demodulates the RF signal and feeds the digital data to a computer. On the return path, the operations are reversed. The digital data is input from a computer to the cable modem which converts it to a modulated RF signal. Once the CMTS receives the RF signal, it demodulates it and transmits the digital data to an external source.

As mentioned above, cable modem technology is in a unique position to meet the demands of users seeking fast access to information services, the Internet and business applications, and can be used by those interested in cable commuting. Not surprisingly, with the growing interest in receiving data over cable network systems, there has been a sharper focus on performance, reliability, and improved maintenance of such systems. Consequently, cable companies are in the midst of a transition from their traditional core business of entertainment television programming to being full service providers of video, voice and data telecommunication services. Among the elements that have made this transition possible are technologies such as the cable modem.

When a cable modem is turned on, it must first identify a viable data carrier on the downstream channel. The downstream channel transmits data from the CMTS, specifically the downstream transmitter, to the cable modems. A data carrier is a frequency channel typically 6 MHz wide in the United States and 8 MHz wide in Europe. Until the cable modem identifies the exact frequency channel corresponding to the data carrier, it cannot receive or transmit data. Present techniques for detecting a viable data carrier are inefficient, impractical, and take too much time upon powering up a cable modem.

There are two commonly used techniques for a cable modem to locate a viable data carrier. The most direct and efficient technique is preconfiguring the cable modem to immediately identify the correct data carrier in a particular geographical area upon power up. The cable modem is connected to the cable plant within the particular geographical area in which it will be sold and used, and is given time to detect the correct data carrier (methods for locating the data carrier are described below). Once the correct data carrier has been identified, the cable modem is configured to "tune in" on that frequency channel when turned on by a subscriber. However, preconfiguring cable modems in this manner will not be practical or cost-effective once cable modems become more widespread. Eventually, cable modem manufactures will assemble cable modems at one or more manufacturing facilities and ship them out to locations across the country. Preconfiguring individual cable modems for particular geographical areas will soon become cumbersome, impractical, and error-prone.

Another technique for locating the correct data carrier frequency channel is having the cable modem check each potential frequency as provided for in a frequency plan. A frequency plan is a list of frequencies used in a particular geographical area in a cable plant. Presently, there are about six frequency plans in use across the country. However, the number of plans is increasing and will likely keep growing as the number of subscribers increases. For example, a frequency plan can specify that each frequency channel starting at every $6^{th}$ MHz, beginning with 88 MHz is a potential data carrier. The cable modem checks all frequency channels according to the list to locate the correct data carrier (there will only be one from the list that works for a particular geographical area, the list itself is used by one cable plant that covers several geographical areas). However, searching the list for the correct data carrier can take up to 20 minutes. This is because it can take up to 500 milliseconds to check each potential channel.

Related to this technique is configuring the cable modem to search all potential frequency channels from all frequency plans in order to find the correct channel. While this makes the cable modem more "generic" in that it can be used in any market or geographical area, the search time can exceed 40 minutes. Moreover, as mentioned above, the number of frequency lists will very likely grow in the future making this technique impractical. It is also possible that a cable company sets the downstream transmitter in a CMTS to the wrong frequency or to a frequency that is not included in a particular frequency plan. Even if the frequency is off by as little as 250 kHz, the cable modem will not register the closest frequency channel as a viable one.

Finally, searching one or more frequency lists can be avoided completely if the cable modem simply searches the entire downstream channel (i.e., from 88 MHz to 860 MHz in the United States, and 50 MHz to 1 GHz in Europe) in 250 kHz increments. By searching all frequency channels starting every 250 kHz, a cable modem can eventually locate the correct data carrier. Many cable modems in use today use this search method but the search time, sometimes well over 40 minutes, is unacceptable.

Therefore, it would be desirable to have a cable modem locate a correct and viable data carrier in its cable plant in as short a time as possible. Subscribers using cable modems should be able to power up a cable modem and use it for digital data transmission preferably within a few minutes. It would also be desirable to shorten the search time needed to locate a viable data carrier while eliminating the need to search one or more frequency plans, thereby making the cable modem ready to be installed in any geographical location. In addition, the search time should be shortened without having to preconfigure the cable modem for a particular geographical area before being used by subscribers.

SUMMARY OF THE INVENTION

According to the present invention, methods, apparatus, and computer program products are disclosed for a cable modem to detect a viable data carrier on the downstream channel in a cable plant. In one aspect of the invention, a method of detecting a data carrier in a downstream channel in a cable television plant is disclosed. A potential or possible frequency channel from the downstream band is selected. It is then determined whether the potential channel contains a signal modulated in a particular modulation scheme where the modulation scheme is one not normally used on signals in the downstream channel, such as QPSK. If the signal in the potential frequency channel is not modulated according to the particular modulation scheme, the cable modem determines whether the signal in the potential channel is modulated according to another particular modulation scheme. This particular modulation scheme, however, is one normally used on signals in the downstream channel. The determination of whether the signal in the potential channel is modulated according to the first particular modulation scheme is done rapidly and only potential channels containing a signal likely to be modulated according to the second particular modulation scheme are examined for the second determination step.

In one embodiment, the first particular modulation scheme is QPSK and the second modulation scheme is either QAM64 or QAM256. In another embodiment, the potential channel is the frequency channel most recently used by the cable modem. In yet another embodiment, a signal from the potential frequency channel is matched against a constellation diagram corresponding to the first particular modulation scheme. Similarly, in yet another embodiment, the signal from the potential frequency channel is matched against a constellation diagram corresponding to the second particular modulation scheme. In yet another embodiment, it is determined whether the signal-to-noise ratio associated with the potential frequency channel is less than a particular preset signal-to-noise ratio threshold after the potential channel is matched against the first particular modulation scheme. Similarly, in yet another embodiment, it is determined whether the signal-to-noise ratio associated with the potential frequency channel is greater than a particular preset signal-to-noise ratio threshold after the potential channel is matched against the second particular modulation scheme.

In another aspect of the present invention, a method of locating a correct downstream channel for use by a cable modem in a cable plant is described. An unexamined downstream frequency channel having a signal is selected from multiple unexamined downstream frequency channels. In a first step, it is determined whether the signal in the unexamined downstream frequency channel is not modulated according to a particular modulation scheme and has a signal-to-noise ratio less than a first particular threshold signal-to-noise ratio. In a second step, if the unexamined downstream frequency channel does have a signal-to-noise ratio higher than the first particular threshold signal-to-noise ratio, the first step is repeated using another unexamined downstream frequency channel. In a third step, it is determined whether the signal in the unexamined frequency channel is modulated according to a second particular modulation scheme and has a signal-to-noise ratio higher than another particular threshold signal-to-noise ratio. In a fourth step, if the unexamined downstream frequency channel has a signal-to-noise ratio less than the second particular threshold signal-to-noise ratio, the first step is repeated using another unexamined downstream channel. Finally, steps one through four are repeated until an unexamined downstream frequency channel is selected that has a signal modulated in the second particular modulation scheme and has a signal-to-noise ratio higher than the second particular signal-to-noise ratio.

In another aspect of the present invention, a cable modem capable of detecting signals in the downstream channel modulated in an unexpected modulation scheme is described. The cable modem contains a processor storing configuration instructions relating to multiple modulation schemes. The processor operates in conjunction with a downstream receiving component. The downstream receiving component is configurable by the processor to detect a signal in the downstream channel modulated in any one of the multiple modulation schemes at a given time. These modulation schemes include one or more modulation schemes not normally associated with the downstream receiving component.

In one embodiment, the cable modem also includes one or more standard amplifiers, a tuner, a media access control unit for manipulating addresses in data packet headers; and a transmitter chip for modulating digital data to an analog signal for transmission upstream. In another embodiment, the processor in the cable modem is coupled to a memory area that stores the configuration instructions relating to the various modulation schemes, including configuration instructions for QPSK, QAM64, and QAM256.

BRIEF DESCRIPTION OF THE DRAWINGS

The invention will be better understood by reference to the following description taken in conjunction with the accompanying drawings in which.

DETAILED DESCRIPTION

Figure 1:
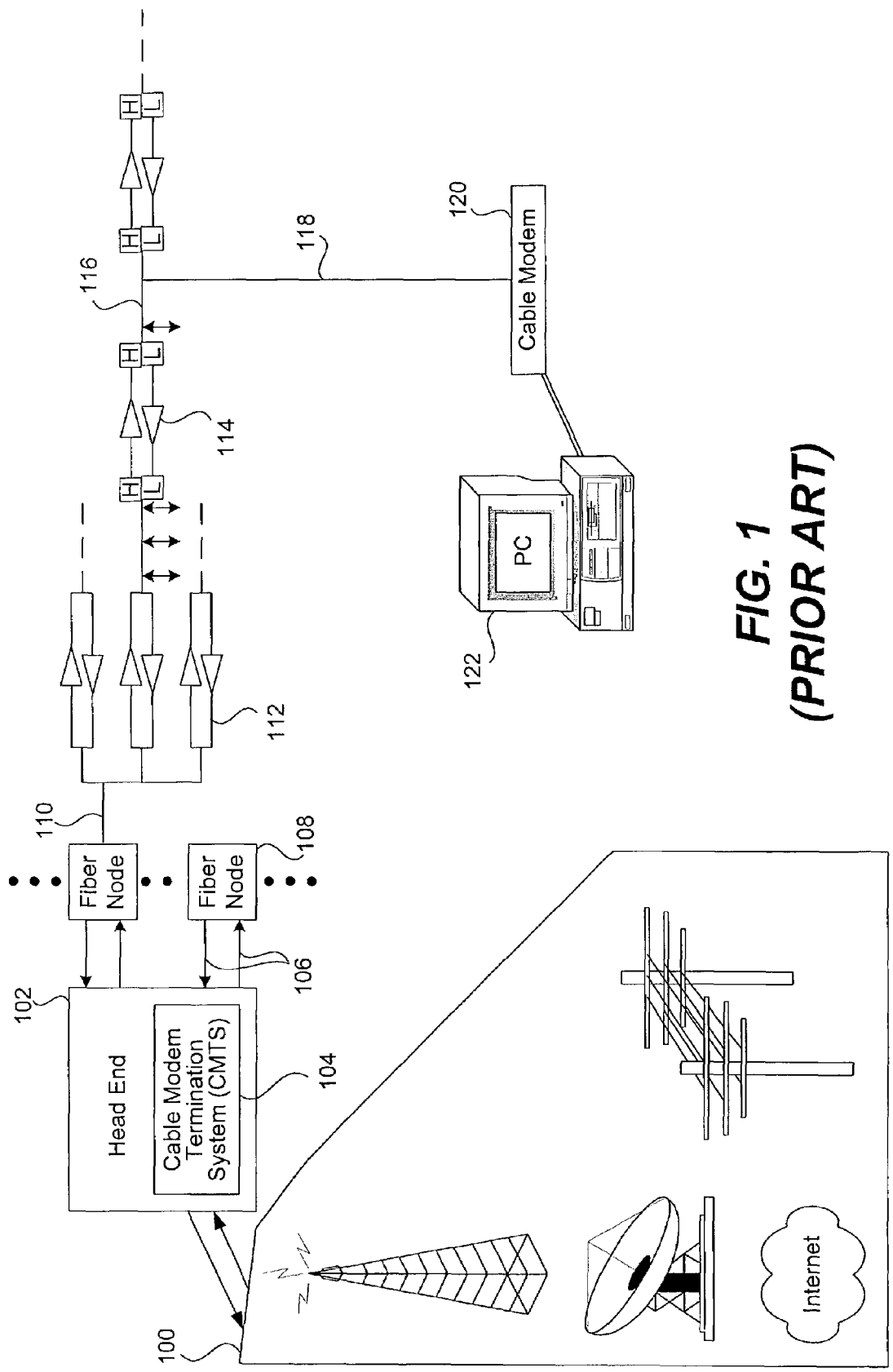
FIG. 1 is a block diagram of a two-way HFC cable system utilizing a cable modem for data transmission.

Reference will now be made in detail to a preferred embodiment of the invention. An example of the preferred embodiment is illustrated in the accompanying drawings. While the invention will be described in conjunction with a preferred embodiment, it will be understood that it is not intended to limit the invention to one preferred embodiment. To the contrary, it is intended to cover alternatives, modifications, and equivalents as may be included within the spirit and scope of the invention as defined by the appended claims.

In accordance with one embodiment of the present invention, there is provided a technique and system for enabling a cable modem to efficiently detect a data carrier in the downstream band as described in the various figures. Before a cable modem can begin operating as a component in a cable modem network, such as within a hybrid fiber-coaxial (HFC) cable television plant, it must first be able to receive messages from its designated cable modem termination system (CMTS). For example, when a cable modem is turned on, it must wait to receive an initial maintenance request message from the CMTS before it can begin operating. However, in order to receive the initial maintenance message, and all subsequent messages from the CMTS, the cable modem, after internal initialization, must detect or identify a data carrier on the downstream channel.

Detecting and tuning in to the correct data carrier can be a time-consuming and inefficient process for the cable modem resulting in long wait times before an end-user can begin using the cable modem. This is particularly true when a cable modem is first installed at a subscriber location. As described above, the cable modem can be either preconfigured to automatically tune in to the correct data carrier for a particular geographical area or can perform various types of searches of frequency plans or the entire downstream band which can involve searching up to 1,600 frequencies. None of these methods has been satisfactory either in terms of subscriber or cable operator satisfaction (length start-up wait times) or marketability (sales limited by geographical areas), and are likely to be less satisfactory as cable modems become more widespread. A different type of search for the correct frequency that is not dependent on frequency lists is described in the various drawings. It involves performing a rapid search of all potential channels by checking whether a signal is modulated according to certain modulation schemes and examining corresponding signal-to-noise ratios (SNRs).

Although known in the art, it is helpful to briefly review three known modulation schemes: quadrature phase-shift keying (QPSK), 64-level quadrature amplitude modulation (QAM64), and 256-level quadrature amplitude modulation (QAM256). These three modulation schemes carry data in a carrier wave composed by mixing two signals which are 90 degrees out of phase. These two signals are called the IN-PHASE signal and the QUADRATURE signal. The QAM method (including also a 16-level QAM) of digital modulation provides a high bandwidth or symbol rate efficiency. In this discussion "symbol" refers to a single data item or datum. This makes it attractive for use in applications required to facilitate efficient use of the radio frequency spectrum. One such application is transmitting data downstream from a CMTS to cable modems in a cable television plant.

In a QPSK modulated signal the data carried by the transmitted wave is contained in the phase of the wave. In a QPSK wave, the phase of the data carrier takes on one of four possible values or data points, also referred to as symbols (described in greater detail below). Each symbol has two bits. In QAM64 there are 64 symbols where each symbol has four bits. This is illustrated in greater detail below. In QAM256 there are 256 symbols where each symbol has six bits. To illustrate the bandwidth or symbol rate capabilities of the various modulation schemes, a 5 MHz data carrier can carry 10 megabits of data if modulated in QPSK, 30 megabits of data if modulated in QAM64, and 40 megabits of data if modulated in QAM256. The drawback to using higher order modulation schemes is their increased sensitivity to noise. Signals modulated in QAM64 or QAM256 require a higher SNR for reliable data transmission than a signal modulated in QPSK. As described above, the downstream channel in a cable plant is far less susceptible to noise than the upstream channel. Thus signals can be modulated in QAM64 or QAM256 on the downstream and still transmit data reliably.

Figure 2:
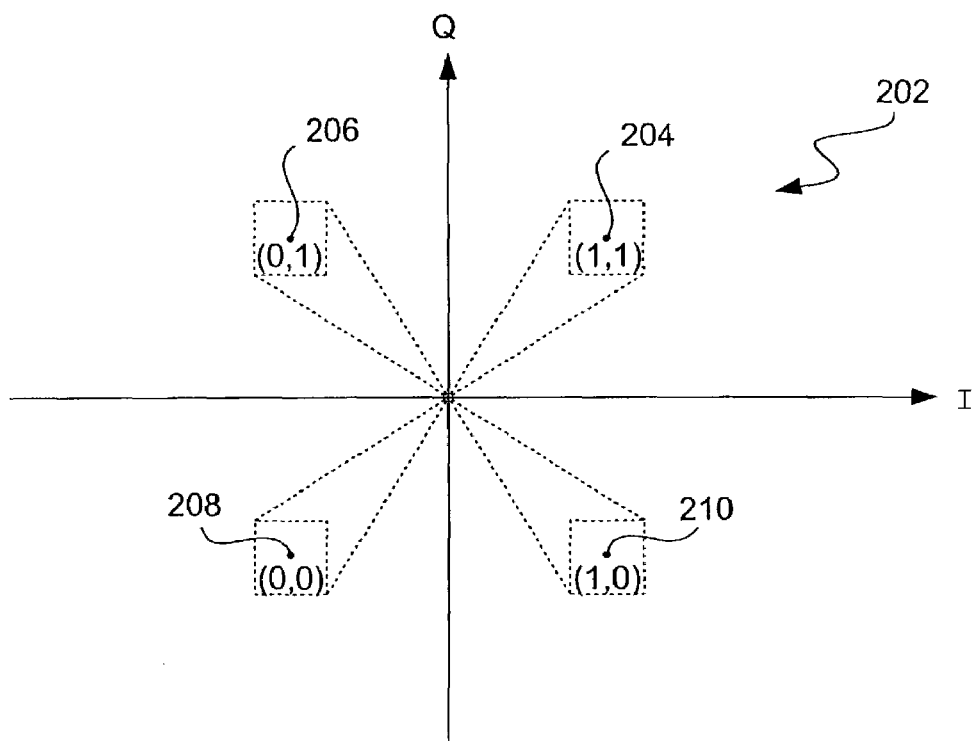
FIG. 2 is a constellation diagram for the QPSK modulation scheme showing each of four data points as is known in the art.
Figure 3:
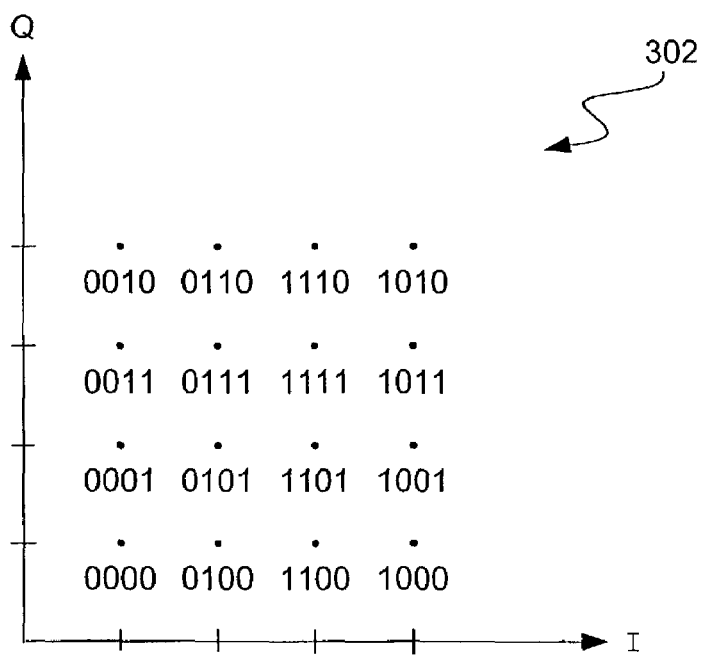
FIG. 3 is a partial constellation diagram for the QAM64 modulation scheme as is known in the art.

Each modulation scheme has a corresponding signal space diagram, referred to as a constellation diagram, that shows the data points. Each data point has an associated bit pattern, which is also shown in a constellation diagram. FIGS. 2 and 3 are constellation diagrams of two modulation schemes used for transmitting data in a cable plant as is known in the art. FIG. 2 is a constellation diagram 202 for QPSK showing each of the four data points, 204, 206, 208, and 210. Each of these data points or symbols have two bits as follows: 11, 01, 00, and 10. The horizontal line, Q, represents an in-phase signal (i.e. cos (w,t)) and the vertical line, I, represents a quadrature signal (i.e. sin (w,t)). As is known in the data communication arts, the symbols represent different states of a signal's amplitude and phase. With QPSK, I and Q can be one of two values: 1 or −1, thus providing a maximum of four symbols. This low number of symbols makes checking for QPSK modulation simple and efficient. A downstream receiver chip in a cable modem configured to detect a QPSK modulated signal can do so by checking how closely the data in the signal being examined falls in relation to the symbol points. FIG. 2 shows regions around each symbol. If data in a signal falls within a region, such as box 212, the signal is a QPSK modulated signal and has an acceptable signal-to-noise ratio. As is discussed in greater detail below, this efficiency is used to expedite the detection of a viable data carrier by a cable modem.

A processor in a cable modem having the function of detecting a correct data carrier, such as a downstream receiver chip or demodulator, does so by examining whether the signal has an acceptable modulation scheme, namely, either QAM64 or QAM256. The processor performs this function by programming a receiver chip for the expected modulation type and symbol rate, then examines the demodulation error of received symbols which are sampled at the symbol rate. The demodulator in the receiver chip contains a circuit called a slicer. The slicer chooses the symbol of the constellation which is closest in Euclidean distance to the received signal sample. Let $S_i$ represent a sampled symbol. If there are k symbols in the constellation, and $A_k$ represents the alphabet of symbols, then the demodulation error, $E_i$, is $E_i=|S_i-A_k|^2$. The slicer chooses a value of $A_k$ which minimizes $E_i$. When the demodulation error is averaged over many symbols, the average signal-noise ratio, $SNR_{ave}$, is computed using the formula:

$$SNR_{ave}=M-10*\log E_i=M-10*\log |S_i-A_k|^2$$

M is a constant dependent on the modulation type: QPSK, QAM-64, or QAM-256. When the demodulation error $E_i$ is high, then the $SNR_{ave}$ will be low and vice versa. If the modulation type matches the symbols being received, then carrier lock is determined by comparing $SNR_{ave}$ to a threshold. If $SNR_{ave}>SNR_{threshold}$, then carrier lock is declared. Typical threshold values without error correcting code are: $SNR_{QPSK}=15$ dB; $SNR_{QAM-64}=25$ dB; and $SNR_{QAM-256}=35$ dB In contrast, with QPSK, a receiver chip would not have to measure numerous amplitudes of the signal since there are only two: 1 or –1. The chip must be able to decode each data point thereby deriving a constellation if the channel being examined is modulated in QAM64 or QAM256. If a message point is off by more than 250 kHz, the chip will not be able to decode the data point, and will interpret the signal as noise. It will assume that the channel is not a downstream data carrier. The processing time increases significantly when the signal is not a QAM64 or QAM256 signal; that is, it normally takes a processor several hundred milliseconds to make the determination that a signal is QAM64 or QAM256 signal. On the other hand, if a signal is modulated in QAM64 or QAM256, the receiver can detect the modulation scheme fairly rapidly. In the described embodiment, this characteristic is also used to expedite the detection of a viable data carrier, as is discussed in greater detail below. A receiver chip checks for peaks in the I and Q signals. The peaks set ranges that are used to digitize the signal. Thus, as is known in the art, the receiver chip must scramble the data to ensure that the peaks can be detected.

Figure 4:
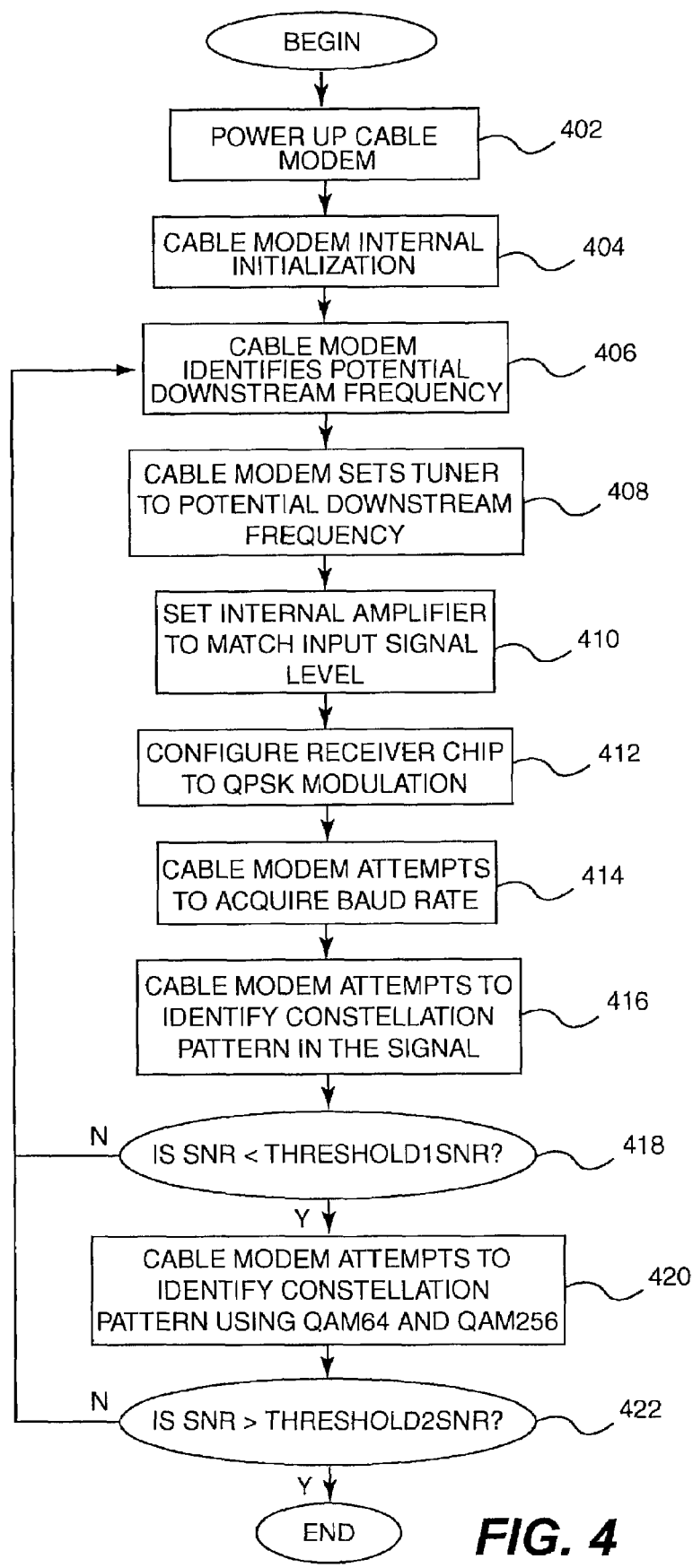
FIG. 4 is a flow diagram of a process for detecting a downstream data carrier in a cable television plant in accordance with one embodiment of the present invention.

FIG. 4 is a flow diagram of a process for detecting a downstream data carrier in a cable television plant in accordance with one embodiment of the present invention. At a step 402 a subscriber or cable operator (if the cable modem is being installed for the first time) turns on a cable modem. Upon being powered up, the cable modem first goes through an internal initialization process at a step 404. This start-up process is strictly internal to the cable modem and does not require a downstream data carrier. It involves initializing the CPU and other components in the cable modem. At a step 406, the cable modem identifies a potential downstream frequency. In the described embodiment, the first downstream frequency that the modem checks is the most recently used frequency, stored in cache memory by the CPU in the cable modem. The cable modem can keep a list of recently used frequency channels and try each one of the frequency channels from the list. In another embodiment the downstream frequency can be chosen from a frequency list as described above. In another preferred embodiment, the cable modem begins checking at the smaller end of the downstream band. In many plants in the United States, this is at 90 MHz and ends at 862 MHz. In Europe the downstream channel is from 102 MHz to 862 MHz.

At a step 408 the CPU in the cable modem sets its internal tuner to the potential downstream frequency determined in step 406. The internal tuner, CPU, and other components of the cable modem are described in greater detail in FIG. 5 below. At a step 410, the CPU in the cable modem sets the internal amplifier to match the input signal level. The internal amplifier ensures that the signal itself has a fixed amplitude or energy level. The output from the amplifier is an intermediate frequency signal. This is a standard step taken in a typical cable modem. At a step 412, the cable modem's receiver chip or demodulator is configured to check for a QPSK modulated signal. The receiver chip is configured by the cable modem CPU. In the described embodiment, the receiver chip is configured to check for QPSK. In other preferred embodiments, the receiver chip can be configured to check for other modulation schemes such that checking for such schemes would be faster than checking for QAM64 or QAM256 and wherein the results of such a check can be interpreted meaningfully. In the described embodiment, a check for a QPSK modulated signal when the signal is actually a QAM64 or QAM256 modulated signal results in noise. As described in greater detail below, this result can be used in a meaningful way to quickly detect signals modulated in QAM64 or QAM256.

At a step 414 the cable modem attempts to acquire a particular baud rate by extracting a data clock (a constant frequency signal) from the received signal. As is known in the art, the data clock is converted to a logical pulse and informs the receiver in the cable modem when to take a "snap shot" of the data. In the described embodiment, the data clock is extracted using custom circuitry using I (in-phase) and Q (quadrature) values. Theoretically, the baud rate should be constant but in actual implementation fluctuates somewhat due to distortion from the communication medium. The baud rate is acquired by the receiver chip. Step 414 is the first step in attempting to locate a data signal in the downstream channel. At a step 416 the cable modem attempts to identify a particular constellation pattern in the signal. In the described embodiment, the constellation pattern is for QPSK as shown in FIG. 3A. A viable data carrier in the downstream channel will be modulated in either QAM64 or QAM256. If a receiver chip is configured for QPSK modulation, and the transmitted signal is QAM64 or QAM256, then the average signal-noise ratio, $SNR_{ave}$, will be low, but not zero, because of the nature of the demodulation error (reference previous derivation of demodulation error, $E_i$). In each quadrant of a QPSK constellation, there is precisely one valid alphabetic symbol, $A_k$, which is a vector in two-dimensional I-Q space. Since there are 4 quadrants, k∈{1, 2, 3, 4} for QPSK. In a QAM64 modulated transmissions, each quadrant contains 16 alphabetic symbols. Since there are 4 quadrants, k∈{1, ..., 64} for QAM64. The 64:4 alphabetic symbol mismatch ratio assures that the average demodulation error, hence the value of $SNR_{ave}$, will tend to be constant. With QAM256, there is a 256:4 alphabetic symbol mismatch ratio with a slightly different value of $SNR_{ave}$. Furthermore, this determination can be made quickly; in the range of 4 to 5 milliseconds. That is, the receiver can determine that a signal is not modulated according to a particular scheme much faster than the time it would take to determine that it is modulated in a particular scheme. This is particularly true for modulation schemes having numerous data points, such as QAM256 which has 256 symbols. For higher order modulation schemes, the cable modem needs time to gather sufficient data to "fill in" or build up the constellation diagram to make a determination as to whether the signal is modulated in the particular higher order modulation scheme, such as QAM64 or QAM256.

Once the cable modem attempts to find a constellation pattern, which in the described embodiment it will not since it is searching for QPSK and no signal on the downstream is modulated in QPSK, control goes to a step 418. At step 418 the CPU checks whether the signal-to-noise ratio (SNR) is less than a predetermined SNR threshold. At this step the cable modem is checking whether the signal being examined is a data carrier at all. If the SNR of the frequency being examined is better (i.e., greater than) the threshold SNR, the frequency is not a viable data carrier and control returns to step 406 where a next channel is examined. In the described embodiment, the next channel is 250 kHz higher than the last one. If the last one was a most recently used channel or some channel from a frequency plan, the cable modem begins with the first frequency in downstream band (86 MHz in the United States). In the described embodiment, the SNR threshold is set to approximately 12 dB, a low SNR indicating a noisy channel. Thus, if the channel being examined is greater than the threshold SNR, the channel is a potential data carrier. At this stage the cable modem has identified a channel that has a significantly greater chance of being the correct data carrier for the downstream channel. Thus, all channels that were definitely not eligible candidates for being a data carrier were eliminated at step 418 expeditiously by a simple comparison of SNR values.

At a step 420 the cable modem attempts to identify or match the channel against QAM64 and QAM256 constellations. The receiver chip is reconfigured by the cable modem CPU to process QAM64 and then QAM256 signals. This process is similar to step 416 except that the constellation has 64 points and 256 symbols, respectively. FIG. 3B shows the first quadrant of a QAM64 constellation diagram. Once the quick check is completed, the receiver chip may be reprogrammed to detect QAM64 and QAM256. A complete check takes longer since the bit stream of the signal is also being examined for the presence of MPEG frames and a cable modem data stream. The complete check requires about 0.5 seconds each for QAM64 and QAM256. As mentioned above, this comparatively long detection time is one reason a cable modem can take up to 40 minutes to find an acceptable data carrier.

Once the cable modem goes through this process, at a step 422 the cable modem checks whether the SNR is above a certain threshold SNR, different from the threshold SNR used at step 418. In the described embodiment, this threshold (i.e., "threshold2SNR" in the flow diagram) is in the range of 23 to 25 dB. It is still possible at this stage that the channel being examined, although modulated in QAM64 or QAM256, has too much noise. Thus, if the SNR of the channel is not greater than the threshold SNR value, control returns to step 406 where the cable modem identifies another potential channel. If the SNR of the channel is greater than the threshold SNR, the cable modem has successfully detected a data carrier and the process is complete.

Figure 5:
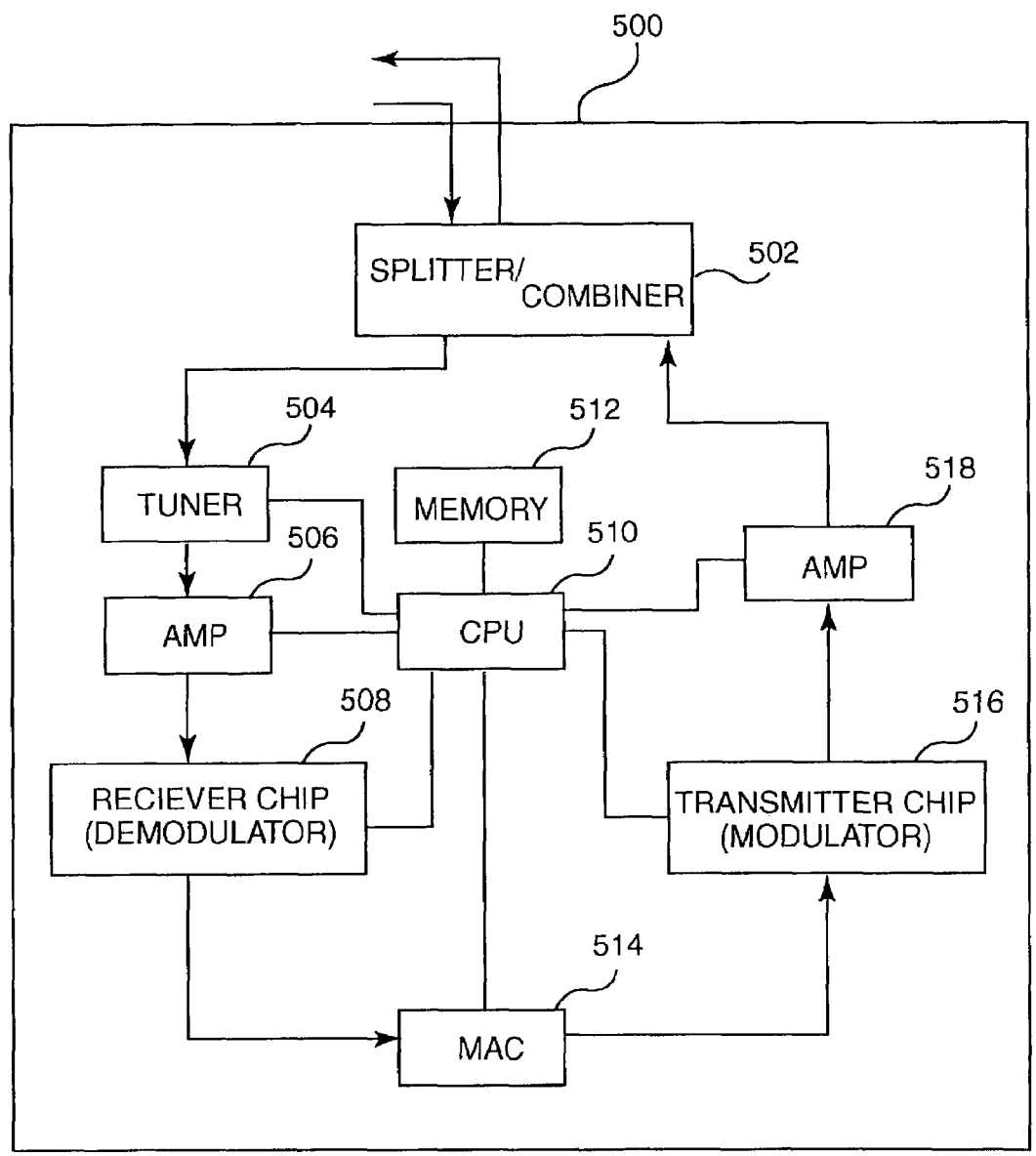
FIG. 5 is a block diagram showing internal components of a cable modem in accordance with one embodiment of the present invention.

FIG. 5 is a block diagram showing internal components of a cable modem in accordance with one embodiment of the present invention. A cable modem 500 takes as input a downstream channel having a frequency range of 86 MHz to 860 MHz in the United States or 50 MHz to 1 GHz in Europe. The first component to receiver a downstream channel is a splitter/combiner 502. The downstream channel is routed to a tuner 504. The tuner selects a particular input frequency from the downstream channel and outputs a radio frequency at the particular frequency. For example, that frequency can be 86 MHz or the most recently used frequency, as described in step 406 of FIG. 4. In the described embodiment, tuner 504 is a standard tuner found in cable modems and other devices that manipulate radio frequencies.

An amplifier 506 ensures that the signal has a fixed amplitude regardless of input power level and, like the tuner, is a standard component found in cable modems. The output from amplifier 506 is an intermediate frequency that is input to a receiver chip 508. Receiver chip 508 is essentially a demodulator that attempts to decode the intermediate frequency data signal having a particular frequency. The analog signal from amplifier 506 is converted to a digital signal by receiver chip 508. As mentioned earlier, an important function of receiver chip 508 is to compare the digitized data signal to a particular constellation diagram. A CPU 510 in communication with receiver chip 508 can instruct the chip to compare the data signal to one of several constellation diagrams. As described above with respect to FIG. 4, the constellation diagrams of interest in the described embodiment of the present invention are those for QPSK, QAM64, and QAM256. This comparison is performed by receiver chip 508 operating in conjunction with CPU 510. CPU 510 has its own memory 512 and is also in communication with tuner 504 and amplifier 506 and a media access control (MAC) unit 514. CPU 510 configures receiver chip 508 and other components in the cable modem. MAC unit 514 and other components in a cable modem are described in greater detail in U.S. application Ser. No. 08/962,231, filed on Oct. 31, 1997, entitled "Echo Device Method for Locating Upstream Ingress Noise Gaps at Cable Television Headends," commonly assigned, and incorporated by reference herein. Aside from setting parameters for and instructing components in cable modem 500, CPU 510 also performs the signal-to-noise ratio comparisons described in steps 418 and 422 of FIG. 4.

A demodulated data signal is routed to MAC unit 514 and is then routed to a transmitter chip 516 which modulates and prepares the signal for transmission upstream by modulating the signal in QAM16 or QPSK. Transmitter chip 516, also referred to as the physical layer chip, and a second amplifier 518, not central to the process of the present invention, are also described in greater detail in U.S. patent application Ser. No. 08/962,231, previously incorporated by reference herein. The modulated signal, typically between 5 to 42 MHz, is then transmitted upstream after going through splitter/combiner 502.

Although the foregoing invention has been described in some detail for purposes of clarity of understanding, it will be apparent that certain changes and modifications may be practiced within the scope of the appended claims. Furthermore, it should be noted that there are alternative ways of implementing both the process and apparatus of the present invention. For example, although the invention has been described using QPSK for the initial signal comparison, other similarly simple or low symbol rate modulation schemes can be used, such as QAM16 or BPSK. In another example, signal-to-noise ratios other than the ones mentioned can be used as thresholds in determining if a data carrier has an acceptable noise level. In yet another example, the cable modem can begin examining channels from a concatenation of frequency plans before beginning at the smaller end of the downstream band. Accordingly, the present embodiments are to be considered as illustrative and not restrictive, and the invention is not to be limited to the details given herein, but may be modified within the scope and equivalents of the appended claims.

The invention claimed is:

1. An apparatus of detecting a data carrier in a downstream band in a cable plant, the apparatus comprising:
 (a) means for selecting a potential data carrier from within the downstream band;
 (b) means for determining whether the potential data carrier contains a signal modulated according to a first modulation scheme wherein the first modulation scheme is not a default modulation scheme used on signals in the downstream band;

(c) means for determining whether the potential data carrier contains a signal that is apparently not modulated according to the first modulation scheme; and (d) means for determining whether the potential data carrier contains a signal modulated according to a second modulation scheme wherein the second modulation scheme is the default modulation scheme used on signals in the downstream band.

2. The apparatus of claim 1 wherein the means for selecting a potential data carrier further comprises means for determining a data carrier most recently used by the cable modem.

3. The apparatus of claim 1 wherein the first modulation scheme is QPSK and the second modulation scheme is one of QAM64 and QAM256.

4. The apparatus of claim 1 wherein the means for determining whether the potential data carrier contains a signal modulated according to a first modulation scheme further comprises means for matching a signal from the potential data carrier against a constellation corresponding to the first modulation scheme.

5. The apparatus of claim 1 wherein the means for determining whether the potential data carrier contains a signal modulated according to a second modulation scheme further comprises means for determining whether a signal-to-noise ratio associated with the potential data carrier when demodulated according to the first modulation scheme is less than a first predetermined signal-to-noise ratio in which case the potential data carrier is not accepted.

6. The apparatus of claim 1 wherein the means for determining whether the potential data carrier contains a signal modulated according to a second modulation scheme further comprises means for matching a signal from the potential data carrier against a constellation corresponding to the second modulation scheme.

7. The apparatus of claim 1 further comprising means for determining whether a signal-to-noise ratio for the second modulation scheme associated with the potential data carrier is greater than a second predetermined signal-to-noise ratio.

8. The apparatus of claim 1 further comprising means for configuring a receiver chip in the cable modem to detect a QPSK signal before step (b) and then reconfiguring the receiver chip to detect one of a QAM64 signal and a QAM256 signal before step (c).

9. An apparatus of locating a correct downstream channel for use by a cable modem in a cable plant, the apparatus comprising:

(a) means for, from a plurality of unexamined downstream frequency channels, selecting an unexamined downstream frequency channel;

(b) means for determining whether the unexamined downstream frequency channel does not have a first modulation-type signal and a signal-to-noise ratio higher than a first predetermined threshold signal-to-noise ratio;

(c) means for determining whether the unexamined downstream frequency channel has a signal-to-noise ratio higher than the first predetermined threshold signal-to-noise ratio;

(d) means for returning to step (a);

(e) means for determining whether the unexamined downstream frequency channel has a second modulation-type signal and a signal-to-noise ratio less than a second threshold signal-to-noise ratio;

(f) means for determining whether the unexamined downstream frequency channel has a signal-to-noise ratio less than the second threshold signal-to-noise ratio;

(g) means for returning to step (a); and (h) means for repeating steps (a) to (g) until an unexamined downstream frequency channel is selected that has a second modulation-type signal and signal-to-noise ratio at least as high as the second threshold signal-to-noise ratio.

10. The apparatus of claim 9 wherein the means for selecting an unexamined downstream frequency channel further comprises means for determining a channel most recently used by the cable modem for previous communication in the cable plant.

11. The apparatus of claim 9 wherein the means for selecting an unexamined downstream frequency channel further comprises means for selecting a frequency channel from a plurality of frequency plans.

12. The apparatus of claim 9 wherein the means for determining whether the unexamined downstream frequency channel does not have a first modulation-type signal and a signal-to-noise ratio higher than a first predetermined threshold signal-to-noise ratio further comprises means for matching a signal in the unexamined downstream frequency channel against a constellation corresponding to a first modulation scheme.

13. The apparatus of claim 12 wherein the first modulation scheme is QPSK.

14. The apparatus of claim 9 wherein the means for determining whether the unexamined downstream frequency channel has a second modulation-type signal and a signal-to-noise ratio less than a second threshold signal-to-noise ratio further comprises means for matching a signal in the unexamined downstream frequency channel against a constellation corresponding to a second modulation scheme.

15. The apparatus of claim 14 wherein the second modulation scheme is one of QAM64 and QAM256.

16. The apparatus of claim 9 wherein the second modulation-type signal is one of a QAM64 and QAM256 modulated signal.

17. An apparatus of detecting a data carrier in a downstream channel in a cable plant, the apparatus comprising:

(a) means for selecting a potential data carrier;

(b) means for attempting to analyze the potential data carrier for a particular modulation scheme, wherein the modulation scheme is not a default modulation scheme used on signals in the downstream band;

(c) means for determining whether a signal-to-noise ratio in the potential data carrier when analyzed for the particular modulation scheme is greater than a defined threshold signal-to-noise ratio;

(d) means for determining whether the signal-to-noise ratio is greater than the defined threshold signal-to-noise ratio; and (e) means for abandoning the potential data carrier from further consideration and selecting a different data carrier for further analysis.

18. The apparatus of claim 17 further comprising means for selecting the potential data carrier for further analysis for determining whether the potential data carrier is a viable data carrier if the signal-to-noise ratio is below the defined threshold signal-to-noise ratio.

19. The apparatus of claim 18 further comprising:

(f) means for attempting to analyze the potential data carrier for an expected modulation scheme;

(g) means for determining whether a signal-to-noise ratio in the potential data carrier when analyzed for the expected modulation scheme is greater than a second defined threshold signal-to-noise ratio;

(h) means for determining whether the signal-to-noise ratio is greater than the second defined threshold signal-to-noise ratio; and
(i) means for using the potential data carrier as a viable data carrier.

20. The apparatus of claim 17 wherein the particular modulation scheme is QPSK.

21. An apparatus of detecting a data carrier in a downstream band in a cable plant, the apparatus comprising:
(a) means for selecting a potential data carrier from within the downstream band;
(b) means for determining that the potential data carrier does not contain a signal modulated according to a first modulation scheme wherein the first modulation scheme is not a default modulation scheme used on signals in the downstream band; and
(c) means for determining that the potential data carrier contains a signal modulated according to a second modulation scheme wherein the second modulation scheme is the default modulation scheme used on signals in the downstream band by concluding that the potential data carrier contains a signal that is apparently not modulated according to the first modulation scheme.

22. A cable modem comprising:
a CPU (central processing unit);
a memory; and
instructions for detecting a data carrier in a downstream band in a cable plant, the instructions comprising:
(a) instructions for selecting a potential data carrier from within the downstream band;
(b) instructions for determining whether the potential data carrier contains a signal modulated according to a first modulation scheme wherein the first modulation scheme is not a default modulation scheme used on signals in the downstream band;
(c) instructions for determining whether the potential data carrier contains a signal that is apparently not modulated according to the first modulation scheme; and
(d) instructions for determining whether the potential data carrier contains a signal modulated according to a second modulation scheme wherein the second modulation scheme is the default modulation scheme used on signals in the downstream band.

23. The cable modem of claim 22 wherein the instructions for selecting a potential data carrier further comprise instructions for determining a data carrier most recently used by the cable modem.

24. The cable modem of claim 22 wherein the first modulation scheme is QPSK and the second modulation scheme is one of QAM64 and QAM256.

25. The cable modem of claim 22 wherein the instructions for determining whether the potential data carrier contains a signal modulated according to a first modulation scheme further comprise instructions for matching a signal from the potential data carrier against a constellation corresponding to the first modulation scheme.

26. The cable modem of claim 22 wherein the instructions for determining whether the potential data carrier contains a signal modulated according to a second modulation scheme further comprise instructions for determining whether a signal-to-noise ratio associated with the potential data carrier when demodulated according to the first modulation scheme is less than a first predetermined signal-to-noise ratio in which case the potential data carrier is not accepted.

27. The cable modem of claim 22 wherein the instructions for determining whether the potential data carrier contains a signal modulated according to a second modulation scheme further comprise instructions for matching a signal from the potential data carrier against a constellation corresponding to the second modulation scheme.

28. The cable modem of claim 22 further comprising instructions for determining whether a signal-to-noise ratio for the second modulation scheme associated with the potential data carrier is greater than a second predetermined signal-to-noise ratio.

29. The cable modem of claim 22 further comprising instructions for configuring a receiver chip in the cable modem to detect a QPSK signal before step (b) and then reconfiguring the receiver chip to detect one of a QAM64 signal and a QAM256 signal before step (c).

30. A cable modem comprising:
a CPU (central processing unit);
a memory; and
instructions for detecting a data carrier in a downstream channel for use by a cable modem in a cable plant, the instructions comprising:
(a) instructions for, from a plurality of unexamined downstream frequency channels, selecting an unexamined downstream frequency channel;
(b) instructions for determining whether the unexamined downstream frequency channel does not have a first modulation-type signal and a signal-to-noise ratio higher than a first predetermined threshold signal-to-noise ratio;
(c) instructions for determining whether the unexamined downstream frequency channel does have a signal-to-noise ratio higher than the first predetermined threshold signal-to-noise ratio;
(d) instructions for returning to step (a);
(e) instructions for determining whether the unexamined downstream frequency channel has a second modulation-type signal and a signal-to-noise ratio less than a second threshold signal-to-noise ratio;
(f) instructions for determining whether the unexamined downstream frequency channel has a signal-to-noise ratio less than the second threshold signal-to-noise ratio;
(g) instructions for returning to step (a); and
(f) instructions for repeating steps (a) to (g) until an unexamined downstream frequency channel is selected that has a second modulation-type signal and signal-to-noise ratio at least as high as the second threshold signal-to-noise ratio.

31. The cable modem of claim 30 wherein the instructions for selecting an unexamined downstream frequency channel further comprise instructions for determining a channel most recently used by the cable modem for previous communication in the cable plant.

32. The cable modem of claim 30 wherein the instructions for selecting an unexamined downstream frequency channel further comprise instructions for selecting a frequency channel from a plurality of frequency plans.

33. The cable modem of claim 30 wherein the instructions for determining whether the unexamined downstream frequency channel does not have a first modulation-type signal and a signal-to-noise ratio higher than a first predetermined threshold signal-to-noise ratio further comprise instructions for matching a signal in the unexamined downstream frequency channel against a constellation corresponding to a first modulation scheme.

34. The cable modem of claim 33 wherein the first modulation scheme is QPSK.

35. The cable modem of claim 30 wherein the instructions for determining whether the unexamined downstream frequency channel has a second modulation-type signal and a signal-to-noise ratio less than a second threshold signal-to-noise ratio further comprise instructions for matching a signal in the unexamined downstream frequency channel against a constellation corresponding to a second modulation scheme.

36. The cable modem of claim 35 wherein the second modulation scheme is one of QAM64 and QAM256.

37. The cable modem of claim 30 wherein the second modulation-type signal is one of a QAM64 and QAM256 modulated signal.

38. A cable modem comprising:
a CPU (central processing unit);
a memory; and
instructions for detecting a data carrier in a downstream channel in a cable plant, the instructions comprising:
  (a) instructions for selecting a potential data carrier;
  (b) instructions for attempting to analyze the potential data carrier for a particular modulation scheme, wherein the modulation scheme is not a default modulation scheme used on signals in the downstream band;
  (c) instructions for determining whether a signal-to-noise ratio in the potential data carrier when analyzed for the particular modulation scheme is greater than a defined threshold signal-to-noise ratio;
  (d) instructions for determining whether the signal-to-noise ratio is greater than the defined threshold signal-to-noise ratio; and
  (e) instructions for abandoning the potential data carrier from further consideration and selecting a different data carrier for further analysis.

39. The cable modem of claim 38 wherein the instructions further comprise instructions for selecting the potential data carrier for further analysis for determining whether the potential data carrier is a viable data carrier if the signal-to-noise ratio is below the defined threshold signal-to-noise ratio.

40. The cable modem of claim 39 further comprising:
  (f) instructions for attempting to analyze the potential data carrier for an expected modulation scheme;
  (g) instructions for determining whether a signal-to-noise ratio in the potential data carrier when analyzed for the expected modulation scheme is greater than a second defined threshold signal-to-noise ratio;
  (h) instructions for determining whether the signal-to-noise ratio is greater than the second defined threshold signal-to-noise ratio; and
  (i) instructions for using the potential data carrier as a viable data carrier.

41. The cable modem of claim 38 wherein the particular modulation scheme is QPSK.

42. A cable modem comprising:
a CPU (central processing unit);
a memory; and
instructions for detecting a data carrier in a downstream band in a cable plant, the instructions comprising:
  (a) instructions for selecting a potential data carrier from within the downstream band;
  (b) instructions for determining that the potential data carrier does not contain a signal modulated according to a first modulation scheme wherein the first modulation scheme is not a default modulation scheme used on signals in the downstream band; and
  (c) instructions for determining that the potential data carrier contains a signal modulated according to a second modulation scheme wherein the second modulation scheme is the default modulation scheme used on signals in the downstream band by concluding that the potential data carrier contains a signal that is apparently not modulated according to the first modulation scheme.

43. A method for handling a plurality of modulation schemes for a downstream channel in a cable plant, comprising:
  (a) determining whether the downstream channel employs a modulation scheme that is not default for the downstream channel; and
  (b) if the downstream channel is found to employ the modulation scheme that is not default, moving to a second downstream channel for analysis.

44. The method of claim 43 further comprising:
determining that the second downstream channel does not employ the non-default modulation scheme; and
determining whether the second downstream channel employs a default modulation scheme.

45. The method of claim 44 wherein it is found that the second downstream channel employs the default modulation scheme, and further comprising determining whether a signal-to-noise ratio for the default modulation scheme in the second channel is greater than a threshold signal-to-noise ratio.

46. The method of claim 45 wherein it is found that the signal-to-noise ratio for the default modulation scheme in the second channel is greater than the threshold signal-to-noise ratio, and further comprising selecting the second downstream channel for communication with a CMTS of the cable plant.

47. The cable modem of claim 44 wherein it is found that the second downstream channel employs the default modulation scheme, and wherein the instructions further comprises instructions for determining whether a signal-to-noise ratio for the default modulation scheme in the second channel is greater than a threshold signal-to-noise ratio.

48. The cable modem of claim 45 wherein it is found that the signal-to-noise ratio for the default modulation scheme in the second channel is greater than the threshold signal-to-noise ratio, and wherein the instructions further comprises instructions for selecting the second downstream channel for communication with a CMTS of the cable plant.

49. A system for handling a plurality of modulation schemes for a downstream channel in a cable plant, comprising:
  (a) means for determining whether the downstream channel employs a modulation scheme that is not default for the downstream channel; and
  (b) means for moving to a second downstream channel for analysis.

50. The system of claim 49 further comprising:
means for determining that the second downstream channel does not employ the non-default modulation scheme; and
means for determining whether the second downstream channel employs a default modulation scheme.

51. The system of claim 50 wherein it is found that the second downstream channel employs the default modulation scheme, and further comprising means for determining whether a signal-to-noise ratio for the default modulation scheme in the second channel is greater than a threshold signal-to-noise ratio.

52. The system of claim 51 wherein it is found that the signal-to-noise ratio for the default modulation scheme in the second channel is greater than the threshold signal-to-noise ratio, and further comprising means for selecting the second downstream channel for communication with a CMTS of the cable plant.

53. A cable modem comprising:
- a CPU (central processing unit);
- a memory; and
- instructions for handling a plurality of modulation schemes for a downstream channel in a cable plant, the instructions comprising:
  - (a) instructions for determining whether the downstream channel employs a modulation scheme that is not default for the downstream channel; and
  - (b) instructions for moving to a second downstream channel for analysis.

54. The cable modem of claim 53 further comprising:
instructions for determining that the second downstream channel does not employ the non-default modulation scheme; and
instructions for determining whether the second downstream channel employs a default modulation scheme.

* * * * *